United States Patent [19]
Goebel

[11] Patent Number: 6,139,200
[45] Date of Patent: Oct. 31, 2000

[54] REGISTER RESOURCE ALLOCATION FEEDBACK

[75] Inventor: Kurt Goebel, Mountain View, Calif.

[73] Assignee: Sun Microsystems, Inc., Palo Alto, Calif.

[21] Appl. No.: 08/885,563

[22] Filed: Jun. 30, 1997

[51] Int. Cl.⁷ ....................................................... G06F 9/44
[52] U.S. Cl. ................................................................. 395/709
[58] Field of Search ............................................... 395/709

[56] References Cited

U.S. PATENT DOCUMENTS

| | | | |
|---|---|---|---|
| 4,571,678 | 2/1986 | Chaitin | 364/300 |
| 4,763,255 | 8/1988 | Hopkins et al. | 364/300 |
| 4,782,444 | 11/1988 | Munshi el al. | 364/300 |
| 5,233,691 | 8/1993 | Ando et al. | 395/250 |
| 5,249,295 | 9/1993 | Briggs et al. | 395/650 |
| 5,418,958 | 5/1995 | Goebel | 395/700 |
| 5,428,793 | 6/1995 | Odnert et al. | 395/709 |
| 5,481,706 | 1/1996 | Peek | 395/650 |
| 5,517,643 | 5/1996 | Davy | 395/675 |
| 5,590,329 | 12/1996 | Goodnow, II et al. | 395/708 |
| 5,651,124 | 7/1997 | Shen et al. | 395/391 |
| 5,659,721 | 8/1997 | Shen et al. | 395/569 |
| 5,751,985 | 5/1998 | Shen et al. | 395/394 |

FOREIGN PATENT DOCUMENTS 0 051 131   5/1982   European Pat. Off. .

OTHER PUBLICATIONS

Weaver, David L. et al., "The SPARC Architecture Manual", Prentice Hall, (1994) Version 9, pp. 294–298.

Aho, Alfred V. et al., "Intermediate Code Generation", *Compilers Principles, Techniques and Tools,* Chapter 8, Addison–Wesley, (1988) pp. 463–512.

Fred C. Chow et al., "The Priority–Based Coloring Approach to Register Allocation", 10872 ACM Transactions on Programming Languages and Systems, vol. 12, No. 4, Oct. 1990, pp. 501–536.

Gregory J. Chaitin et al., "Register Allocation Via Coloring", 10871 Computer Languages, vol. 6, 1981, pp. 47–57.

*Primary Examiner*—Tariq R. Hafiz
*Assistant Examiner*—Wei Zhen
*Attorney, Agent, or Firm*—McDermott, Will & Emery

[57] ABSTRACT

Techniques for allocating registers when generating code is described. A snapshot is generated when generating code. The snapshot contains sufficient information to restore the state of generating code that existed at the point when the snapshot was generated so that the generation of code can proceed from that point. A first set of code optimizations is generated. In response to determining that the first set of code optimizations fails to meet efficiency criteria, the generation of code proceeds based on the snapshot without incorporating the first set of code optimizations. Feedback is generated by analyzing the allocation of registers based on the first set of code optimizations. A second set of code optimizations is based on the feedback. Feedback includes information such as the number of spills occurring based on the first set of code optimizations. In addition, an allocation of registers based on a second set of code optimizations is performed in parallel with an allocation of registers based on the first set of code optimizations. Generation of code proceeds based on the second set of code optimizations when the second set of code optimizations causes less spilling the first set of code optimizations.

16 Claims, 8 Drawing Sheets

```
main ( ) {
   int a,b,c,d,e,l,m,n,x,y,z c = a+b;        } 212
   e = c+d;        } 214
   z = x+y;        } 216
   n = l+m;        } 218
}
```
} 210

```
main ( ) {
    int a,b,c,d,e,l,m,n,x,y,z c = a+b          } 212
    z = x=y          } 216
    n = l+m          } 218
    e = c+d          } 214
}
```
} 210

```
main ( ) {
    int a,b,c,d,e,l,m,n,x,y,z c = a+b                    } 212  ⎫
    spill c                    } 213  ⎪
    z = x+y                    } 216  ⎬  210
    n = l+m                    } 218  ⎪
    reload c' from memory      } 219  ⎪
    e = c' +d                  } 214  ⎭
}
```

```
main ( ) { int a,b,c,d,e,l,m,n,x,y,z c = a+b;            } 212
        z = x+y;            } 216      } 210
        e = c+d;            } 214
        n = l+m;            } 218
}
```

REGISTER RESOURCE ALLOCATION FEEDBACK

BACKGROUND OF THE INVENTION

1. Field of the Invention

The present invention relates to optimization compilers, and in particular, to an approach using register allocation feedback in the process of allocating registers when generating optimized code.

2. Description of Related Art

One important goal of optimizing compilers is to efficiently allocate physical registers to be used when code generated by an optimizing compiler is executed. The physical registers are actual hardware registers supported by the particular platform on which the code is executed. For the case where the code can be executed in the available physical registers without conflict, the code can be directly assigned to the hardware registers, making the task of efficiently allocating physical registers quite simple. However, in many situations, the number of physical registers is insufficient to execute the code directly. In these situations, the task of efficiently allocating registers becomes more difficult.

Another important goal of optimizing compilers is to improve throughput by increasing parallelism. Parallelism refers to the degree to which instructions generated by the compiler may be executed in parallel. In general, increasing parallelism of code increases the number of physical registers needed to execute the code. Thus, the goal of increasing parallelism is at odds with the goal of efficiently allocating physical registers. To demonstrate this point, an illustration of the effect of increasing parallelism upon one approach for the allocation of registers is provided.

Contemporary optimizing compilers sometimes use a multi-pass approach to allocate physical registers. In one pass, virtual or "symbolic" registers are assigned to code. Virtual registers are sometimes considered to be infinite in number, but for practical reasons, are usually limited to some fairly large number.

During a subsequent pass, the virtual registers are assigned to the available physical registers. For situations when the number of virtual registers is less than or equal to the number of physical registers, assigning the virtual registers to the physical registers can be relatively simple. However, when the number of virtual registers exceeds the number of available physical registers, then the virtual registers must be mapped to the physical registers. In the context of compilers, mapping of virtual registers to physical registers refers to determining an assignment of virtual registers to physical registers which allows all of the computations to be performed in physical registers.

One approach for mapping a set of virtual registers to a set of physical registers is known as the graph coloring approach such as is described in U.S. Pat. No. 4,571,678 issued to Chaitin on Feb. 18, 1986. Generally, the graph coloring approach involves constructing and analyzing a register interference graph for each portion of the code. The register interference graph includes a number of nodes which represent the virtual registers. Pairs of nodes in the graph are connected by lines when two intermediate values (e.g. variables, intermediate computations) represented by nodes cannot simultaneously share a register for some portion of the program, effectively representing a conflict between the two nodes. Two intermediate values cannot simultaneously share a register, when for example, their life times overlap.

The register interference graph is then analyzed and nodes with fewer connections to other nodes than the number of available physical registers are then removed from the graph. If all of the nodes can be removed from the graph, then a coloring can be determined. That is, all of the virtual registers can be mapped to physical registers.

However, sometimes the register interference graph contains one or more nodes having more connections to other nodes than there are available physical registers. Consequently, the code for this routine cannot be executed in the available hardware registers without some of the intermediate values contained in the hardware registers being temporarily stored in memory to free up one or more hardware registers.

The process of temporarily storing data to a memory location is referred to as "spilling." Spilling data involves performing a spill operation, in which the specified data, typically a variable, is written to a temporary memory location, followed by one or more reload operations, which reload the specified data into a hardware register as the specified data is needed in the execution of the code. In terms of the register interference graph, the spilling of data is reflected in the graph and then the graph is rebuilt and analyzed again. This process is then repeated until a mapping of the virtual registers to the physical registers can be obtained.

The high level approach for mapping a set of virtual registers to a set of physical registers according to the graph coloring approach is illustrated by the flow chart of FIG. 1. After starting in step 100, a register interference graph is built in step 102. Then in step 104, the register interference graph is analyzed. As previously described, analyzing the register interference graph involves removing any nodes which have fewer connections to other nodes than the number of available physical registers.

In step 106, a determination is made as to whether the register interference graph can be colored. As previously discussed, if all of the nodes can be removed from the graph, indicating that there are no conflicts, then the graph can be colored. If so, then the process is complete in step 108. On the other hand, if in step 106 the graph cannot be colored, then in step 110, one of the virtual registers is spilled, which eliminates the spilled register as a conflicted node in the graph. In step 112, the register interference graph is rebuilt and then steps 104 through 112 are repeated until the register graph is colored.

Although spilling one or more virtual registers allows a set of virtual registers to be mapped to a set of physical registers, the approach does have some disadvantages. One disadvantage to spilling a virtual register is that additional instructions must be executed to perform the spill and reload operations. The time required to execute the additional instructions increases the overall time required to process a sequence of instructions which provide for the spilling of data. In addition, write and read operations to secondary storage mediums, such as runtime stacks, often take more time to execute than write and read operations to central processing unit (CPU) registers. Clearly, one aim of efficiently allocating registers is to reduce spilling.

Consider the example illustrated by FIG. 2A and FIG. 2B. FIG. 2A shows region 210 and the high level code associated with region 210. Region 210 is used as an example to both illustrate the graph coloring approach to the allocating of physical registers shown in FIG. 1, and to illustrating the effects of increasing parallelism upon the allocation of physical registers. Assume for purposes of illustrations, that the number of physical registers available is two.

In step 102, register interference graphs are built. In this example, FIG. 2B shows register interference graphs generated for region of code 210.

In step 104, the register interference graph is analyzed. In this example, each of the nodes in the register interference graphs shown in FIG. 2B has less than two connections, the number of available physical registers. Consequently, every node can be removed. At step 106, it is determined that the register interference graph can be colored because every node can be removed.

The Problems

As mentioned before, increasing parallelism increases the number of registers needed to execute code. Increasing the number of registers needed to execute code generally leads to increased spilling. In terms of the performance characteristics of code, the cost of increased spilling can often outweigh any benefit derived through increased parallelism. The remainder of the example illustrates this point.

Referring to FIG. 2C, assume that region 210 has now been modified to increase parallelism by an optimizing compiler. FIG. 2C represents region 210 after being modified by an optimizing compiler.

Note that code 216 and code 218 has been moved in front on code 214 to shift the order of execution. Code 216 and code 218 can be shifted in front of code 214 because neither depends on the execution of code 214. Also note that code 216, code 218 and code 212 do not depend on depend on the execution of each other. When processors capable pipelining encounter such a sequence of code, the code may be executed in pipelined parallel fashion.

Re-arranging of the execution of code so that the code may be executed in parallel is one method of increasing parallelism referred to as "scheduling." Approaches for optimizing, including methods that involve the re-arranging of code such as scheduling methods, are well known to those skilled in the art.

Referring to FIG. 1, in step 102 the register interference graph is built. FIG. 2D shows the register interference graph generated. In step 104, the register interference graph in FIG. 2D is analyzed. After removing nodes with less connections than the number of physical registers (i.e. two), node x, y, 1, and m remain. Because not every node can be removed, at step 106 it is determined that the register interference graph cannot be colored. Therefore, control passes to step 112.

At step 110, the virtual register represented by node c is spilled. FIG. 2E shows region 210 after the region has been modified to spill the variable c. Specifically, code 213 is inserted to spill the data in variable c to memory. As previously mentioned, spilling a variable involves writing the variable from a physical register to a memory location, such as a run time stack.

In addition, code 219 has been inserted immediately before code 214 which causes the variable c to be reloaded into a hardware register as c'. Code 214, which depends on the value of variable c generated by code 212, then uses the variable c'.

In step 112, the register interference graph is rebuilt. FIG. 2F shows the rebuilt register interference graph. At step 104, all the nodes may be removed because every node has less connections than the number of physical registers. At step 106, it is determined that the register interference graph may be colored because all the nodes have been removed in step 104. Execution of the steps ceases.

The above example demonstrates that modifications made to increase parallelism may lead to spilling. The spilling of variable c causes the execution of several more operations involving accesses to memory, degrading the performance characteristics of the code. The benefit gained from executing code 216 and code 218 in parallel with code 212 is probably far less than the cost of spilling variable c in terms performance. It should be apparent that modifications made to increase parallelism can cause vastly more spilling than that just demonstrated. In these cases, the performance characteristics of code modified to increase parallelism can be far worse than that of code left unmodified.

One conventional approach to generating code optimizations that avoids spilling that may outweigh any benefit derived from code optimizations is the "selective optimization" approach. In the selective optimization approach, code optimizations are limited to situations based on general rules that experience has taught generally lead to improved performance. For example, under the selective optimization approach, code optimizations may be limited to loops. Because code optimizations are applied on the basis of general rules, code optimizations may be generated in situations where they may in fact cause excessive spilling thus degrading performance.

Based on the foregoing, it is clearly desirable to provide a mechanism that prevents optimizations to code that in fact degrade performance.

SUMMARY OF THE INVENTION

Techniques for allocating registers when generating optimized code is described. According to one aspect of the invention, a snapshot is generated when generating code. The snapshot contains sufficient information to restore the state of generating code that existed at the point when the snapshot was generated so that the generation of code can proceed from that point. A first set of code optimizations is generated. In response to determining that the first set of code optimizations fails to meet efficiency criteria, the generation of code proceeds based on the snapshot without incorporating the first set of code optimizations. The efficiency criteria may be based on the allocation of registers that is based on the first set of code optimizations and the extent of parallelism introduced by the first set of code optimizations.

According to another aspect of the invention, feedback is generated by analyzing the allocation registers based on the first set of code optimizations. A second set of code optimizations is based on the feedback. Feedback includes information such as the number of spills that occur after incorporation of the previous set of code optimizations.

According to another aspect of the invention, an allocation of registers based on a second set of code optimizations is performed in parallel with an allocation of registers based on the first set of code optimizations. Generation of code proceeds based on the second set of code optimizations when the second set of code optimizations cause less spilling than the first set of code optimizations.

The method and apparatus described herein provides a mechanism that removes code optimizations that actually degrade performance. Another version of code optimizations can be produced in light of feedback generated on the code optimizations that were removed. Furthermore, more than one version of code optimizations can be generated and evaluated in parallel, thereby shortening the time required to evaluate a given number of versions of code optimizations.

The foregoing and other features, aspects and advantages of the present invention will become more apparent from the following detailed description of the present invention when taken in conjunction with the accompanying drawings.

BRIEF DESCRIPTION OF THE DRAWINGS

The present invention is illustrated by way of example, and not by way of limitation, in the figures of the accompanying drawings and in which like reference numerals refer to similar elements and in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, through not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DETAILED DESCRIPTION OF THE PREFERRED EMBODIMENT

A method and apparatus for allocating registers is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 3:
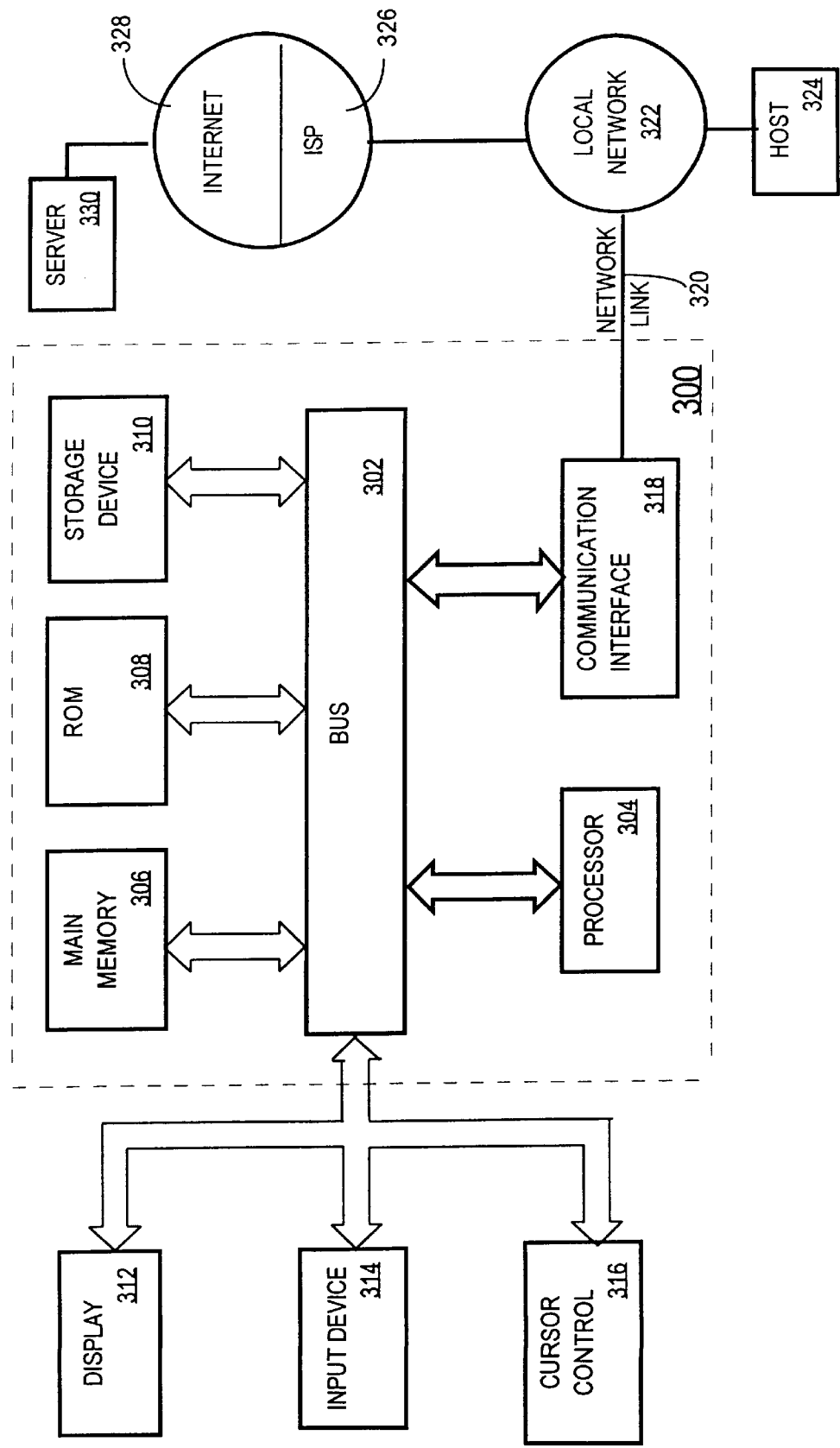
FIG. 3 is a block diagram of a computer system on which the present invention may be implemented.

FIG. 3 is a block diagram which illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions by processor 304. Computer system 300 also includes a read only memory (ROM) 308 or other static storage device coupled to bus 302 for storing static information and instructions for processor 304. A storage device 310, such as a magnetic disk or optical disk, is also provide and coupled to bus 302 for storing information and instructions.

Computer system 300 may also be coupled via bus 302 to a display 312, such as a cathode ray tube (CRT), for displaying information to a computer user. An input device 314, including alphanumeric and other keys, is also provided and coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), which allows the device to specify positions in a plane.

The invention is related to the use of computer system 300 to allocate registers when compiling optimized code. According to one embodiment of the invention, allocating registers when compiling optimized code is provided by computer system 300 in response to processor 304 executing sequences of instructions contained in main memory 306. Such instructions may be read into main memory 306 from another computer-readable medium, such as storage device 310. However, the computer-readable medium is not limited to devices such as storage device 310. For example, the computer-readable medium may include a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read. Execution of the sequences of instructions contained in main memory 306 causes processor 304 to perform the process steps previously described. In alternative embodiments, hard-wired circuitry may be used in place of or in combination with software instructions to implement the invention. Thus, embodiments of the invention are not limited to any specific combination of hardware circuitry and software.

Computer 300 also includes a communication interface 318 coupled to bus 302. Communication interface 308 provides a two-way data communication coupling to a network link 320 to a local network 322. For example, if communication interface 318 is an integrated services digital network (ISDN) card or a modem, communication interface 318 provides a data communication connection to the corresponding type of telephone line. If communication interface 318 is a local area network (LAN) card, communication interface 318 provides a data communication connection to a compatible LAN. Wireless links are also possible. In any such implementation, communication interface 318 sends and receives electrical, electromagnetic or optical signals which carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals which carry digital data streams. The signals through the various networks and the signals on network link 320 and through communication interface 318, which carry the digital data to and from computer 300 are exemplary forms of carrier waves transporting the information.

Computer 300 can send messages and receive data, including program code, through the network(s), network link 320 and communication interface 318. In the Internet example, a server 330 might transmit a requested code for an application program through Internet 328, ISP 326, local network 322 and communication interface 318. In accord with the invention, one such downloaded application provides for the method of register resource allocation feedback as described herein.

The received code may be executed by processor 304 as it is received, and/or stored in storage device 310, or other non-volatile storage for later execution. In this manner, computer 300 may obtain application code in the form of a carrier wave.

Exemplary Compiler

Figure 4:
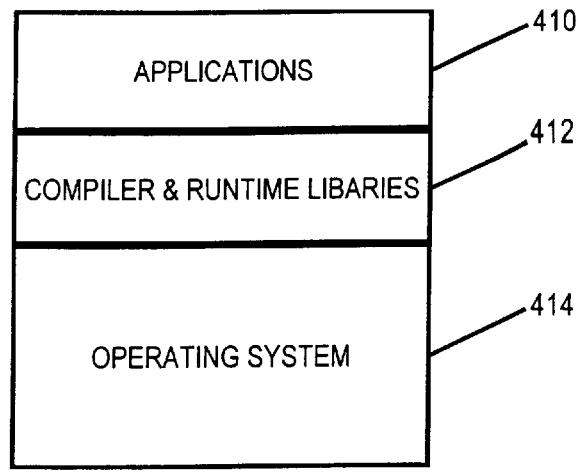
FIG. 4 shows a block diagram showing the software elements of a computer system comprising a high level compiler, and shows a functional diagram showing one embodiment of the high level language compiler.
Figure 4:
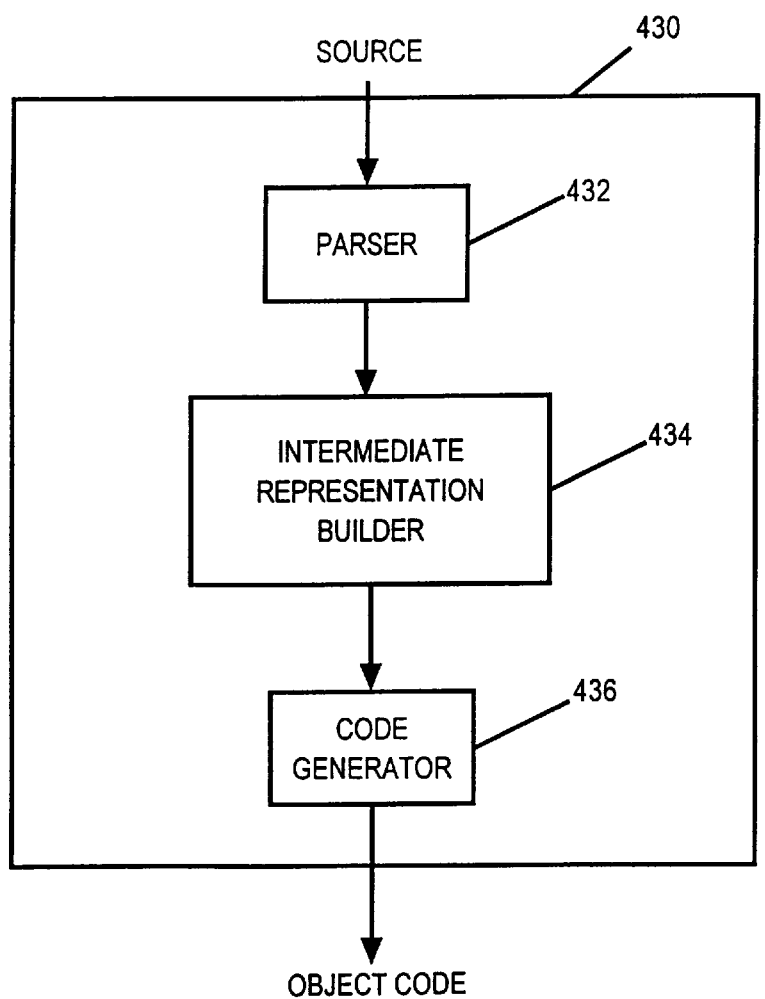

Shown in FIG. 4 is a high level programming language compiler and its run time libraries 412 incorporating the teachings of the methods described herein. Also shown is an operating system 414 providing system services to the compiler and the run time libraries and the applications 410 compiled. The applications 410 are intended to represent a broad category of applications found in many computer systems and will not be described further. The run time libraries 412 and the operating system 414 are also intended to represent a broad category of system software found in most computer systems and will not be described further. The high level programming language compiler 412 will be described in further detail below. Referring now to FIG. 4, the functional block diagram illustrating one embodiment of the high level language compiler of FIG. 4 is shown. Shown is the high level language compiler 430 comprising a parser 432 and intermediate representation builder 434 and a code generator 436 incorporating the teachings of the methods described herein. These elements are sequentially coupled together. Together, they generate executable code, in response to received source code.

The parser 432 receives application source code as inputs, and tokenizes various expressions in the application source code. The intermediate representation builder 434 receives the tokenized expressions as inputs, and generates intermediate representations for these expressions. The code generator 436 receives the intermediate representations as inputs, and generates executable code, including allocation of registers. The code generator 436 allocates registers using techniques well known to those skilled in the arts and the techniques described herein. For further descriptions on various parsers, intermediate representation builders, and code generators, see A. B. Aho and J. D. Ullman, *Compiler, Principles, Techniques, and Tools*, Addison-Wesley, 1985, pp. 146–388, and 463–584.

Allocating Registers Using a Snapshot and Feedback Mechanism

Figure 5:
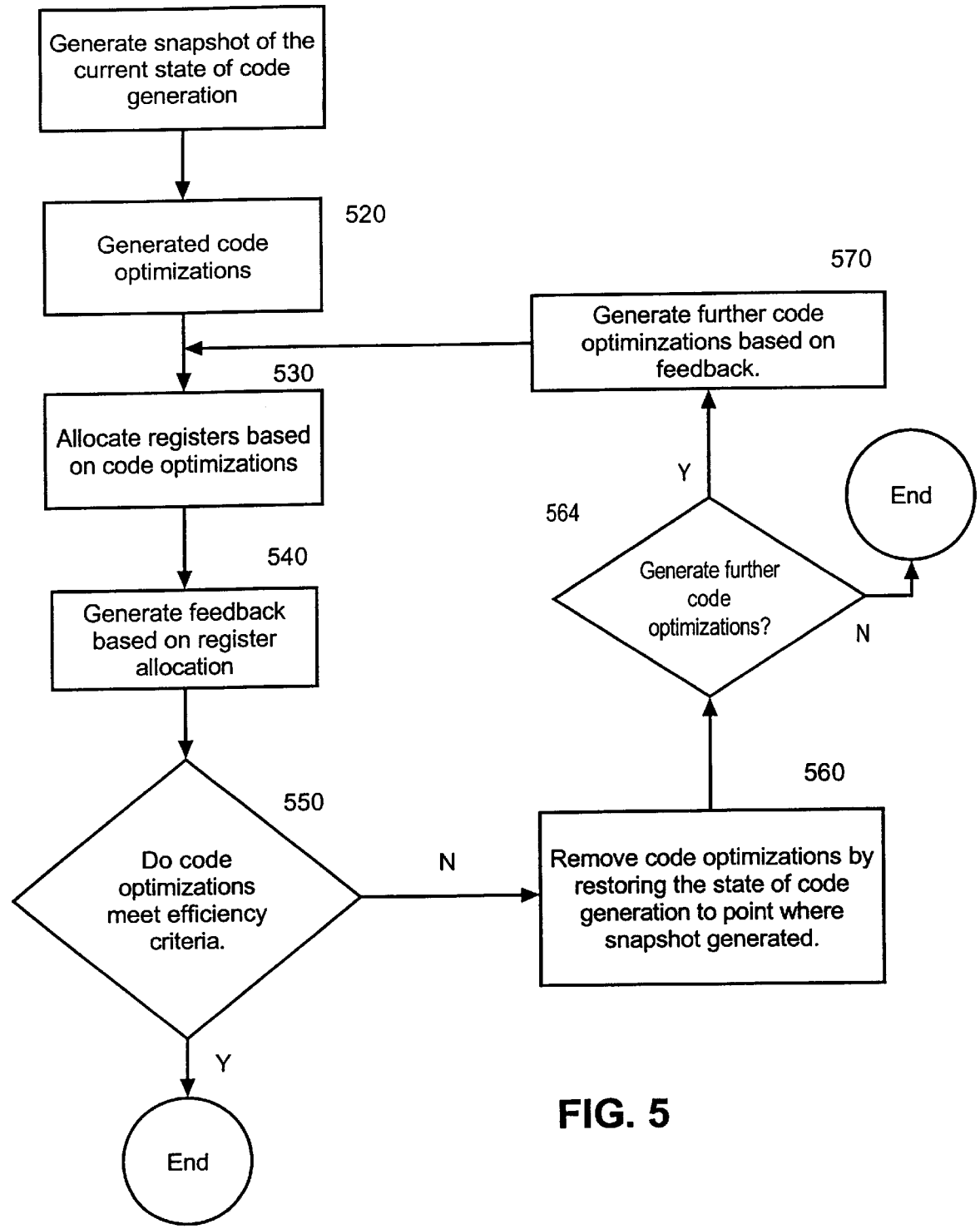
FIG. 5 is a flow chart showing the method of allocating registers using a snapshot and feedback mechanism.

FIG. 5 shows a method of allocating registers and performing code optimizations when compiling code using a snapshot and feedback mechanism. Code optimizations are changes made by the compiler, usually to the intermediate code, that are made in order to enhance some desired characteristic of executable code generated by the compiler. Typically the desired characteristic improves the efficiency with which the executable code may be executed. For example, some code optimizations are undertaken to improve parallelism in order to increase the speed with which the executable code is executed.

The steps in FIG. 5 are performed on a region containing one or more blocks of code. A routine is decomposed into regions using a number of well known approaches, including hierarchical reduction of a routine's control flow graph. Another approach is described in Goebel, *Register Allocation By Decomposing, Reconnecting and Coloring Hierarchical Program Regions*, U.S. Pat. No. 5,418,958, May 23, 1995.

In the course of performing the steps shown in FIG. 5, code optimizations are performed on the region of code. If the code optimizations are performed using a loop scheduling approach, then the region may just contain a single block loop kernel. For a trace scheduling approach, the region may span several blocks which fall through to the most frequently executed paths.

Figure 1:
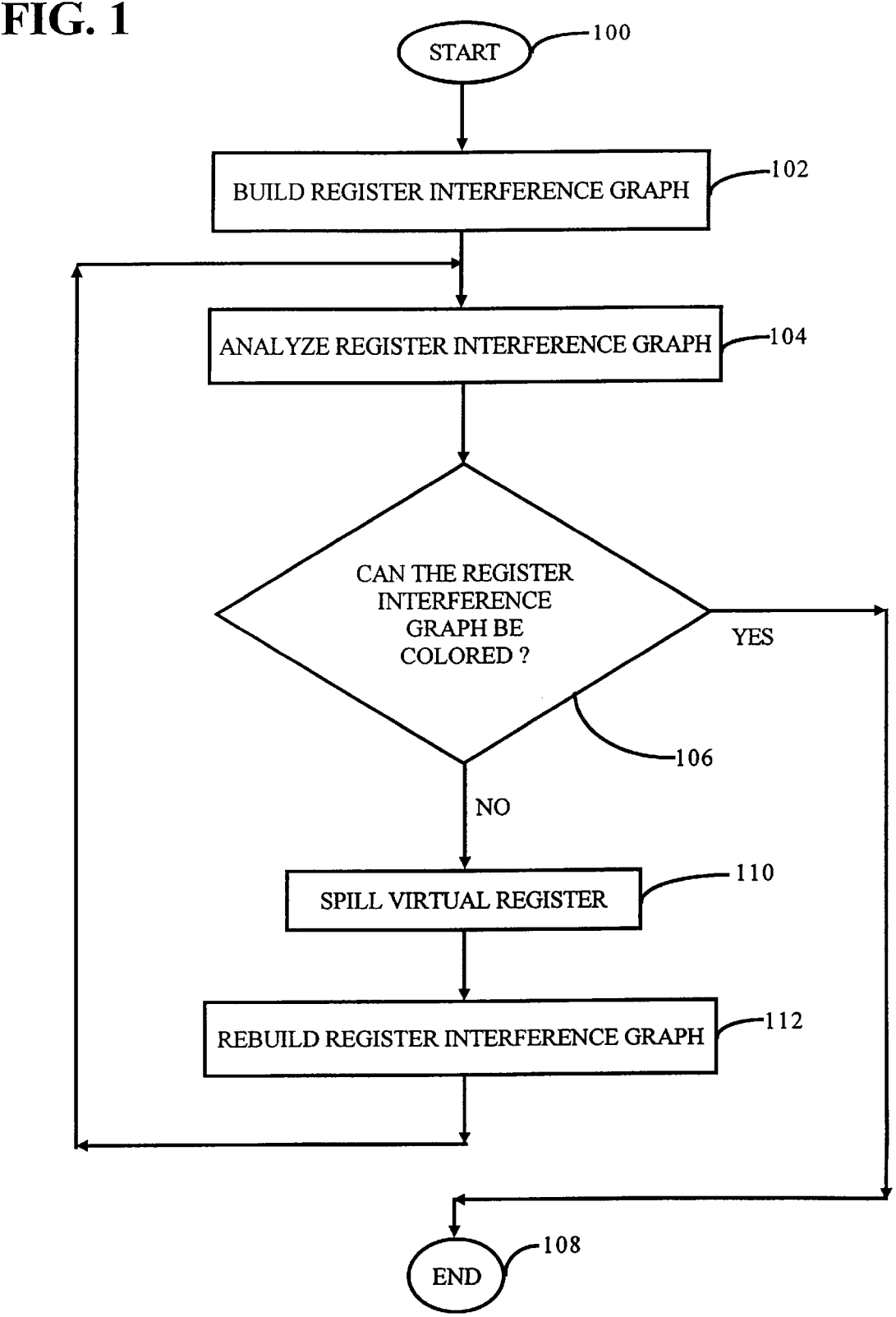
FIG. 1 is a flow chart showing the color graphing approach to allocating registers.
Figures 2A, 2B:
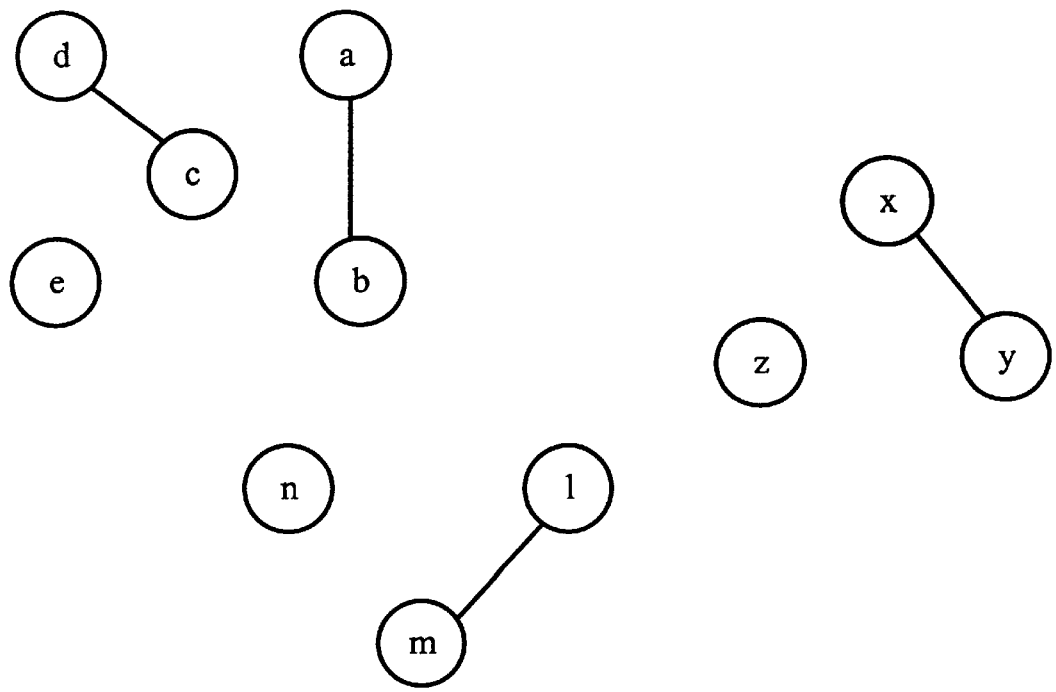
FIG. 2A shows an exemplary region of code.
FIG. 2B shows register interference graphs generated to analyze the allocation of registers for the exemplary region of code.

FIG. 2A shows region 210 and the high level code associated with region 210. Region 210 is used as an example illustrating the performance of the steps shown in FIG. 5.

Referring to FIG. 5, in step 510 a snapshot of the current state of code generation is generated and stored. The generated snapshot contains data about the variant portion of compiling code. This includes the intermediate code, the particular optimization approach (e.g. loop scheduling, trace scheduling), and the internal state of the compiler, including any flags and the number of physical registers available for allocation. The snapshot contains sufficient information such that once compiler incorporates given code optimizations, the state of code generation can be restored to the state existing at the point the snapshot was generated, and the compilation can proceed as if given code optimizations were never incorporated.

In step 520, code optimizations are generated for the region of code. In this example, assume that code optimizations are generated for region 210 to increase parallelism in the manner previously described. As mentioned previously, FIG. 2C shows a high level code representation of region 210 after the code optimizations are generated.

While the generation of code optimizations has been described with respect to increasing parallelism, the generation of other types of code optimizations are possible at this step, such as leaf routine optimization, stack allocation optimization, global and local scheduling. Therefore, it understood that the present invention is not limited to the generation of any specific type of code optimizations.

Figures 2C, 2D:
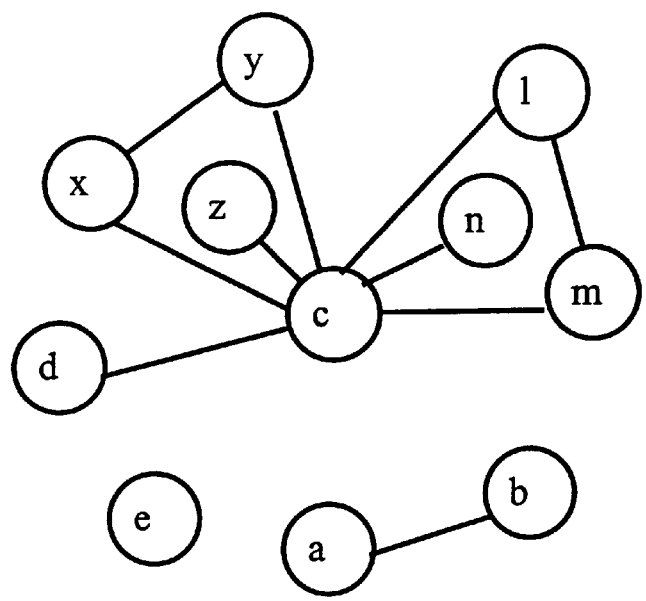
FIG. 2C shows the exemplary region of code after generating code optimizations.
FIG. 2D shows register interference graphs generated to analyze allocation of registers for the exemplary region of code after generation of code optimizations.
Figures 2E, 2F:
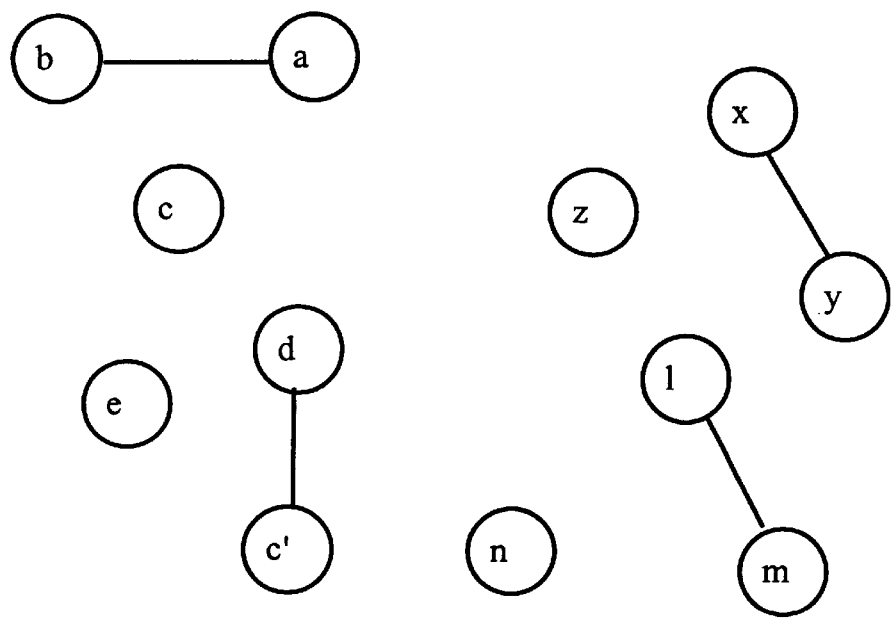
FIG. 2E shows the exemplary region of code after spilling intermediate values to accommodate the generation of code optimizations.
FIG. 2F shows register interference graphs generated to analyze allocation of registers after the spilling represented in FIG. 2E.

In step 530, physical registers are allocated with respect to the region of code. In this example, the graph coloring approach is used to allocate physical registers and determine intermediate values that may require spilling FIG. 2D shows the register interference graph generated. As mentioned earlier, after removal of the nodes with edges greater equal to or greater than the number of physical registers (two), node c, l, m, x, and y remain. Thus any of variables represented by the nodes may require spilling. Control passes to step 540.

At step 540, feedback is generated based on the allocation of registers in step 530. The feedback includes data useful to adjusting the generation of code optimizations. Such data includes the number of virtual registers spilled and the number of instructions re-arranged. The feedback can also include the data representing the register interference graph, which indicates the number of connections for each node.

In this example, the feedback information would indicate that node c, 1, m, x, and y have two connections after the nodes with less than two connections have been removed (i.e. the number of physical registers). Thus at least one variable requires spilling.

At step 550, a determination is made of whether the code optimizations meet efficiency criteria. The criteria include the application of such factors as the number of variables that may be spilled, the number of instructions being performed in parallel, whether the spills are occurring in a sequence of instructions expected to be frequently executed (e.g. instructions within a loop), and whether the code optimizations optimize the performance of a sequence of executable code expected to be frequently executed (e.g. instructions within a loop).

In this example, as result of the generated code optimizations, executable code represented by code 214 and code 216 can be performed in parallel with the executable code represented by code 212. However, the code does not lie within a loop. Performing three instructions in parallel outside of a loop at the expense of spilling one variable fails, for the purposes of this example, fails to meet efficiency criteria. Therefore control passes to step 560.

Re-Generating Code Optimizations

At step 560, the code optimizations generated in step 530 are removed by restoring the state of compilation to the state that existed before the code optimizations were generated. The information contained in the snapshot is used to restore the state of compilation to the state that existed when the snapshot was generated.

At step 564, a determination is made of whether further code optimizations should be generated. If the number of attempts at regenerating code optimizations in step 570 is equal to a threshold, then no further code optimizations are generated. Execution of the steps ceases. Otherwise, execution of the steps proceeds to step 570. Assume that in this example that the threshold is one. Since no attempts at regenerating code in step 570 have been made, execution of the steps proceeds to step 570.

At step 570, further code optimizations are generated. The code optimizations generated are based on the feedback generated at step 540, and are less aggressive than the code optimizations generated in the previous generation of code optimizations for the region. Less aggressive code optimizations include the rearrangement of less code, limiting the instructions inserted between the spilling of intermediate values so that number of intermediate values with lifetimes overlapping the lifetime of the spilled intermediate value may be reduced, and decreasing other modifications tending to increase the demand for registers.

Figures 2G, 2H:
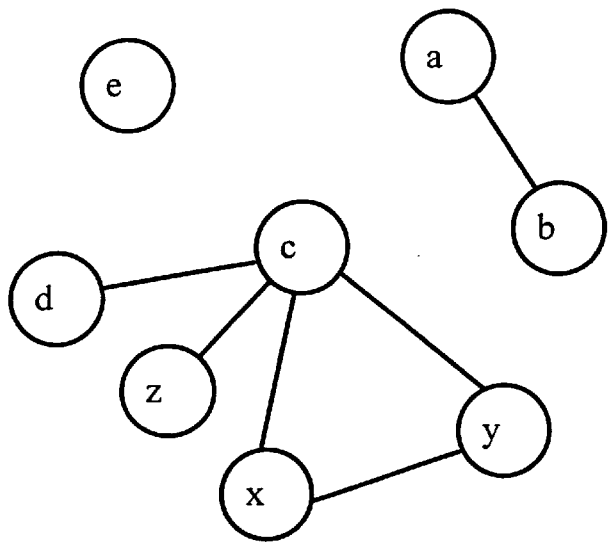
FIG. 2G shows the exemplary region of code after regenerating code optimizations based on feedback.
FIG. 2H shows register interference graphs generated to analyze allocation of registers after regenerating code optimizations based on feedback.

In this example, the feedback indicates that variable c was spilled. Any optimization that increases the number of intermediate values with which variable c shares it lifetime up to and beyond the number of physical registers tend to cause variable c to be spilled. Inserting only the executable code represented by code 216 reduces the number of instructions inserted between the spilling of variable c, and reduces the number of instructions rearranged. Thus the less aggressive optimization of only inserting the executable code represented by code 216 is generated. The high level code shown in FIG. 2G represents region 210 after the optimizations are generated in this step. Control passes to step 530.

In step 530, physical registers are allocated with respect to the region of code. In this example, the graph coloring approach is used to allocate physical registers and determine which intermediate values may require spilling. FIG. 2H shows the register interference graph generated. As mentioned earlier, after removal of the nodes with edges greater than or equal to the number of physical registers (two), node c, x, and y remain. Thus any of variables represented by the nodes may be spilled. Control passes to step 540.

At step 540, feedback is generated based on the allocation of registers in step 530. In this example, the feedback information would indicate that node c, x, and y have two connections after the nodes with less than two (i.e. the number of physical registers) connections have been removed. Thus any of these variables may require spilling.

At step 550, a determination is made of whether the code optimizations meet efficiency criteria. In this example, as a result of the generated code optimizations, executable code represented by code 216 can be performed in parallel with the executable code represented by code 212. However, the code does not lie within a loop. Performing two instructions in parallel outside of a loop at the expense of spilling one variable fails, for the purposes of this example, to meet efficiency criteria. Therefore control passes to step 560.

At step 560, the code optimizations generated in step 530 are removed by restoring the state of compilation to the state that existed before the code optimizations were generated. The information contained in the snapshot is used to restore the state of compilation to the state that existed when the snapshot was generated.

At step 564, a determination is again made of whether further code optimizations should be generated. The number of attempts at regenerating code is one, which is equal to the threshold, Therefore, no further code optimizations are generated. Execution of the steps ceases.

In some embodiments of the invention, a determination in step 564 of whether to continue to regenerate code optimizations is based on feedback and criteria indicating whether further generation of code optimizations is likely to be futile. One example criterion is the number of virtual registers subject to spilling exceeding a threshold number. The threshold number represents the point at which the further generation of code optimizations which may meet the efficiency criteria typically futile.

The generation of multiple code optimizations for a multitude of regions can greatly extend the compile time. To avoid overextending compile time, performance of the steps shown in FIG. 5 may be limited to regions where the potential for performance gains through code optimizations are greatest, such as regions that consists of one or more blocks within a loop. The performance of the steps may also be limited to regions where the potential for generating code optimizations that in fact degrade performance are the greatest.

In other embodiments of the invention, various versions of code optimizations are generated. For each version, the steps for the allocating registers (step 530) and generating feedback (step 540) are performed in parallel. For example, parallel processes can be initiated to generate code optimizations using data from the snapshot as input serving as a basis from which to proceed with the generation of code optimizations. Once all the desired versions of code optimizations are generated, the most efficient version is selected. A basis for selecting the most efficient version can be for example, the most aggressive version which meets the efficiency criteria.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. In a computer system a method for allocating registers while generating code into a set of instructions executed by said computer system said method comprising the steps of:

generating a snapshot of the current state of said generating of said code, said snapshot providing sufficient information to proceed with said generating of said code from the point where said snapshot was generated;

generating a first set of code optimizations;

determining whether said first set of code optimizations meets efficiency criteria; and if determining said first set of code optimizations does not meet said efficiency criteria, then proceeding with said generating of said code without incorporating said first set of code optimizations based on said snapshot.

2. The method of claim 1, wherein:

the method includes the step of generating feedback based on analyzing whether said registers may be allocated based on said first set of code optimizations; and the step of proceeding with said generating of said code includes generating a second set of code optimizations based on said feedback.

3. The method of claim 2, wherein the feedback includes data indicating a number of spills.

4. The method of claim 1, further including the steps of:

generating a second set of code optimizations;

allocating registers based on said first set of code optimizations; and allocating said registers based on said second set of code optimizations, said step of allocating said registers based on said second set of code optimizations being performed in parallel with said step of allocating said registers based on said first set of code optimizations.

5. The method of claim 4, further including the step of in response to determining said second set of code optimizations meets said efficiency criteria, proceeding with said generating of said code based on said second set of code optimizations.

6. The method of claim 5, wherein said efficiency criteria includes said second set of code optimizations causing less spilling than any set of optimizations generated since generating said snapshot.

7. The method of claim 1, wherein:

the method further including the step of allocating registers based on said first set of code optimizations; and the step of determining whether said first set of code optimizations meets said efficiency criteria is based on said step of allocating.

8. The method of claim 7, wherein the step of determining whether said first set of code optimizations meets efficiency criteria is based on the increase in the amount of code which may be executed in parallel due to incorporating said first set of code optimizations.

9. A computer program embodied in a computer-readable medium for minimizing spilling when allocating registers while generating code, said computer program comprising:

a first code segment for generating a snapshot of the current state of said generating of said code, said snapshot providing sufficient information to proceed with said generating of said code from the point where said snapshot was generated;

a first code segment for generating a first set of code optimizations;

a second code segment for determining whether said first set of code optimizations meets efficiency criteria; and a third code segment for proceeding with said generating of said code without incorporating said first set of code optimizations based on said snapshot if determining said first set of code optimizations does not meet said efficiency criteria.

10. The computer program embodied in a computer-readable medium of claim 9, wherein:

the computer program further comprises a fourth code segment for generating feedback based on analyzing whether said registers may be allocated based on said first set of code optimizations; and the third code segment further includes code for proceeding with said generating of said code by generating a second set of code optimizations based on said feedback.

11. The computer program embodied in a computer-readable medium of claim 9, further comprising:

a fifth code segment for generating a second set of code optimizations; and a sixth code segment for performing in parallel the:

allocating of said registers based on said first set of code optimizations, and allocating of said registers based on said second set of code optimizations.

12. A computer system comprising:

a memory;

a processor coupled to said memory;

a code generator stored in said memory for execution by said processor;

said code generator being adapted to generate a snapshot of the current state of said generating of said code, said snapshot providing sufficient information to proceed with said generating of said code from the point where said snapshot was generated;

said code generator being adapted to generate a first set of code optimizations;

said code generator being adapted to determine whether said first set of code optimizations meets efficiency criteria; and said code generator being adapted to proceed with said generating of said code without incorporating said first set of code optimizations based on said snapshot when determining said first set of code optimizations does not meet said efficiency criteria.

13. The computer system of claim 12, further comprising:

said code generator adapted to generate feedback based on analyzing whether said registers may be allocated based on said first set of code optimizations; and said code generator adapted to proceed with said generating of said code by generating a second set of code optimizations based on said feedback.

14. A computer data signal embodied in a carrier wave representing a computer program for minimizing spilling when allocating registers while generating code, said computer program comprising:

a first code segment for generating a snapshot of the current state of said generating of said code, said snapshot providing sufficient information to proceed with said generating of said code from the point where said snapshot was generated;

a first code segment for generating a first set of code optimizations;

a second code segment for determining whether said first set of code optimizations meets efficiency criteria; and a third code segment for proceeding with said generating of said code without incorporating said first set of code optimizations based on said snapshot if determining said first set of code optimizations does not meet said efficiency criteria.

15. The computer data signal embodied in a carrier wave representing a computer program of claim 14, wherein:

the computer program further comprises a fourth code segment for generating feedback based on analyzing whether said registers may be allocated based on said first set of code optimizations; and the third code segment further includes code for proceeding with said generating of said code by generating a second set of code optimizations based on said feedback.

16. The computer data signal embodied in a carrier wave representing a computer program of claim 14, further comprising:

a fifth code segment for generating a second set of code optimizations; and a sixth code segment for performing in parallel the:
allocating of said registers based on said first set of code optimizations, and
allocating of said registers based on said second set of code optimizations.

* * * * *